(12) United States Patent
Shida et al.

(10) Patent No.: US 7,384,608 B2
(45) Date of Patent: Jun. 10, 2008

(54) BATCHWISE HEATING APPARATUS AND METHOD OF DRYING A POLYAMIDE

(75) Inventors: Takatoshi Shida, Niigata (JP);
Hiroyuki Gonoi, Niigata (JP);
Hideyuki Kurose, Niigata (JP);
Kazumi Tanaka, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 637 days.

(21) Appl. No.: 10/868,840

(22) Filed: Jun. 17, 2004

(65) Prior Publication Data
US 2005/0004342 A1   Jan. 6, 2005

(30) Foreign Application Priority Data
Jun. 18, 2003   (JP) ............................. 2003-173506

(51) Int. Cl.
*B01J 19/00* (2006.01)
*C08F 6/00* (2006.01)

(52) U.S. Cl. ...................... 422/131; 422/135; 422/138; 422/109; 528/480

(58) Field of Classification Search ............... 528/480, 528/481; 422/131, 258, 109, 135, 138
See application file for complete search history.

(56) References Cited

U.S. PATENT DOCUMENTS

| | | | | |
|---|---|---|---|---|
| 5,000,889 A | * | 3/1991 | Hamano et al. | ............. 264/466 |
| 5,517,004 A | * | 5/1996 | Blonk | ........................ 219/652 |
| 5,543,495 A | * | 8/1996 | Anolick et al. | ............. 528/481 |
| 5,746,987 A | | 5/1998 | Aulbaugh et al. | |
| 6,104,987 A | * | 8/2000 | Farnsworth | ................ 702/130 |
| 6,105,275 A | * | 8/2000 | Aulbaugh et al. | ............ 34/424 |
| 6,710,162 B2 | * | 3/2004 | Rea | ............................. 528/480 |
| 2004/0068037 A1 | * | 4/2004 | Mitadera et al. | ............ 524/445 |

FOREIGN PATENT DOCUMENTS

| | | |
|---|---|---|
| DE | 10 24 059 | 2/1958 |
| EP | 0 128 286 | 12/1984 |
| GB | 727715 | 4/1955 |
| JP | 9-136985 | 5/1997 |

OTHER PUBLICATIONS

Communication and European Search Report mailed Sep. 22, 2004, for No. EP 04 10 2779.

* cited by examiner

*Primary Examiner*—N. Bhat
*Assistant Examiner*—Rosa M. Holland
(74) *Attorney, Agent, or Firm*—Antonelli, Terry, Stout & Kraus, LLP.

(57) ABSTRACT

Described is an apparatus for the purpose of drying or solid phase polymerization of Polymer particles by batchwise heating the same in an atmosphere of inert gas or under reduced pressure. More particularly, described is batchwise heating apparatus which is capable of efficient production by preventing an objective product from being contaminated with foreign matters accompanying wear of a sealing packing. The batchwise heating apparatus, which heats Polymer particles in a rotating hermetically sealed vessel in an atmosphere of inert gas or under reduced pressure, comprises a vessel equipped with a temperature detection portion capable of measuring temperature even during rotating and a suction/exhaust port inside the vessel capable of reducing pressure and/or replacing with inert gas even during rotating; and a suction/exhaust pipe that is inserted into the vessel so as to communicate with the suction/exhaust port, wherein the rotational sealing portion of the suction/exhaust pipe is installed on the outside of the vessel.

20 Claims, 1 Drawing Sheet

BATCHWISE HEATING APPARATUS AND METHOD OF DRYING A POLYAMIDE

TECHNICAL FIELD

The present invention relates to an apparatus for the purpose of drying or solid phase polymerization of pellets, powders, flakes, blocks, particles or mixtures thereof of polyamide, polyester or the like (hereinafter referred to as "Polymer particles") by batchwise heating the same in an atmosphere of inert gas or under reduced pressure. More particularly, it pertains to a batchwise heating apparatus which is capable of efficient production by preventing objective product from being contaminated by foreign matters accompanying the wear of a sealing packing.

BACKGROUND ART

In the case of carrying out drying or solid phase polymerization of Polymer particles by a batchwise system, there is widely adopted a tumbler type apparatus in which liquid phase polymerization polymer as the raw material is charged in a hermetically sealed vessel, and is heated while being rotated together with the vessel in an atmosphere of inert gas or under reduced pressure. The above-mentioned apparatus is generally of such structure that a suction/exhaust port for inert gas introduction or vacuum and a thermometer for measuring pellet temperature are fixed for the sake of convenience of each piping and wiring, whereby only the vessel rotates, and that rotational sealing portions are sealed with a packing for the purpose of preventing moisture or oxygen leaking on the inside of the vessel.

However, the sealing packing is worn by the contact between surrounding structures and Polymer particles owing to repeated drying or solid phase polymerization, and fragments thereof as foreign matters contaminate the objective product, thereby raising a problem of quality deterioration. As a method for preventing the contamination, periodical inspection and replacement of the packing are taken into consideration, but the packing-fitted portion is on the inside of the vessel. Thus it is accompanied with a definite time of shutdown of the apparatus to confirm the progress of packing wear or carry out replacement work, whereby frequent replacement thereof becomes problematic in production cost.

As a method for removing contaminated packing from the product, sorting and removal by means of a color sorting machine or the like are taken into consideration, but raise a problem of the increase in cost such as fixed cost and maintenance cost accompanying the introduction of the sorting machine.

Japanese Patent Laid-Open Application No. 136965/1997 (Heisei 9) discloses a batchwise solid phase polymerization apparatus which controls the reactional conditions by detecting the degree of vacuum inside a hermetically sealed reaction vessel using communication signals from a pressure receiver equipped on the inside of the vessel. Nevertheless nothing is mentioned in the above-mentioned literature in regard to temperature measurement in the vessel nor trouble of foreign matter generation.

As mentioned above, no literature is found regarding a method for solving the trouble of contamination by foreign matters for which the wear of sealing packing is primarily responsible in relation to batchwise drying and solid phase polymerization apparatus. Under such circumstances, it has been eagerly desired to develop a method for solving such trouble.

In such circumstances, the present invention is concerned with an apparatus for the purpose of drying or solid phase polymerization of Polymer particles by batchwise heating the same in an atmosphere of inert gas or under reduced pressure, and an object thereof is to provide a batchwise heating apparatus which is capable of efficient production by preventing objective product from being contaminated by foreign matters accompanying the wear of a sealing packing.

DISCLOSURE OF THE INVENTION

As the result of intensive extensive research and investigation accumulated by the present inventors in order to achieve the object as mentioned above, it has been found that a above-mentioned object is achievable by rotating a suction/exhaust port on the inside of the vessel and a temperature detection portion together with the vessel, removing a necessary sealing portion form the inside thereof, and installing the same on the outside thereof. The present invention has been accomplished on the basis of the foregoing findings and information.

Specifically, the present invention provides a batchwise heating apparatus which heats Polymer particles in a rotating hermetically sealed vessel in an atmosphere of inert gas or under reduced pressure, and which comprises a vessel equipped with a temperature detection portion capable of measuring temperature even during rotating and a suction/exhaust port inside the vessel capable of reducing pressure and/or replacing with inert gas even during rotating; and a suction/exhaust pipe that is inserted into the vessel so as to communicate with the suction/exhaust port, wherein the rotational sealing portion of the suction/exhaust pipe is installed on the outside of the vessel.

In addition, the present invention provides a method for drying polyamide and a method for solid phase polymerization of the same characterized by using the above-mentioned batchwise heating apparatus.

THE MOST PREFERRED EMBODIMENT TO CARRY OUT THE INVENTION

The batchwise heating apparatus according to the present invention heats Polymer particles in a rotating hermetically sealed vessel, and the inside of the vessel comprises a temperature detection portion capable of measuring temperature even during rotating and a suction/exhaust port inside the vessel capable of reducing pressure and/or replacing with inert gas even during rotating. The suction/exhaust port is not stationary, but rotates integrally with the vessel body.

A suction/exhaust pipe is inserted into the vessel so as to communicate with the suction/exhaust port inside the vessel, and the rotational sealing portion of the suction/exhaust pipe is installed on the outside of the vessel. For instance, the suction/exhaust pipe connecting to the suction/exhaust port is allowed to protrude outward from the outside wall of the vessel, the rotational sealing portion is installed on the protruded portion, and sealing is performed by allowing a ring packing or the like to intervene between the suction/exhaust pipe and the bearing so as to encompass the peripheral surface of the suction/exhaust pipe. By such constitution, it is enabled to prevent worn sealing material such as packing in slidingly contact with the suction/exhaust pipe and/or bearing from directly mixing in the vessel.

In addition, it is preferable to install a plurality of the suction/exhaust ports inside the vessel, and in particular to arrange either of the suction/exhaust ports so as not to be always embedded in the Polymer particle layer and further to install a filter at each of the suction/exhaust ports. The filter can prevent the leaking of the Polymer particles in the vessel to the outside and at the same time, contamination by foreign matters from the outside.

The above-mentioned temperature detection portion is not specifically limited provided that it is located in the aforesaid vessel, and is capable of measuring the temperature even during rotation of the vessel, and enables outside system to grasp the measurement result. For instance, wireless communication signals are emitted from the temperature detection portion located in the vessel, and are receivable on the outside. As the wireless communication signals, there are available ultrasonic wave, electromagnetic wave, visible light and the like. Continuous monitoring of the temperature inside the vessel enables proper and correct control of a heating state.

A method for heating the vessel is not specifically limited provided that it can supply necessary quantity of heat, but heating with a jacket by the use of a heating medium or steam is usual and desirable from the aspect of cost and operational control.

Figure 1:
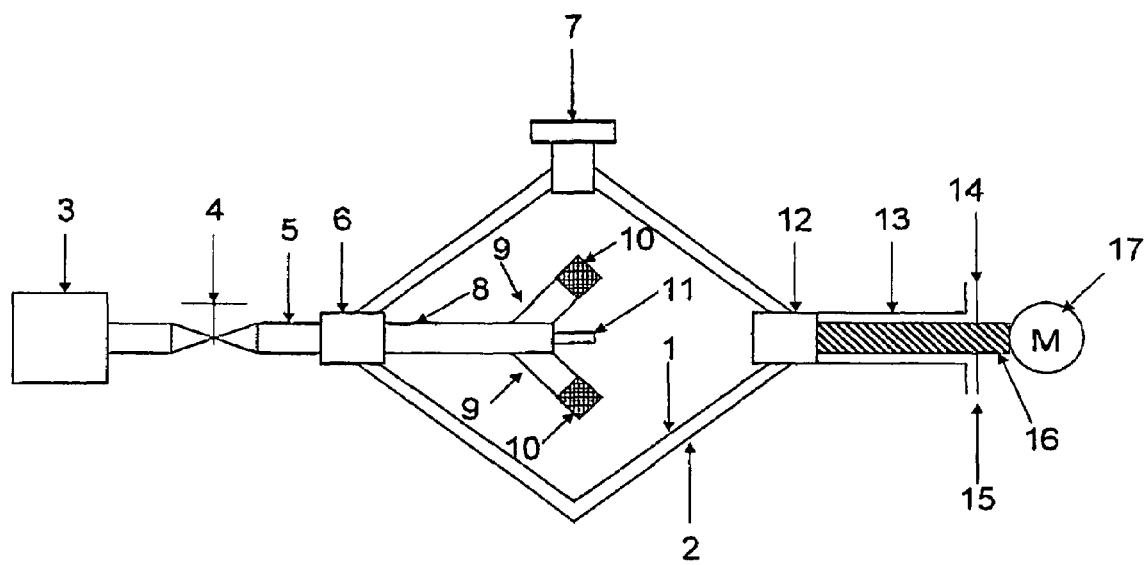
FIG. 1 is a schematic explanatory drawing illustrating an example of the batchwise heating apparatus according to the present invention.

In the following, specific description will be given of the batchwise heating apparatus according to the present invention with reference to the attached drawing, however the apparatus is not limited to the structure thereof exemplified hereunder, provided that the apparatus satisfies the gist and summary of the present invention. FIG. 1 is a schematic explanatory drawing illustrating an example of the batchwise heating apparatus according to the present invention.

The symbols in the drawings shall have the following designations.
1: drying and/or solid phase polymerization vessel
2: heating jacket
3: inert gas introduction device and/or vacuum generator
4: gas introduction or vacuum arresting valve
5: suction/exhaust pipe (hollow stationary shaft on opposite side of driving)
6: bearing on opposite side of driving
7: raw material introduction and product discharge port
8: suction/exhaust pipe inserted into the vessel (hollow stationary shaft)
9: suction/exhaust port inside the vessel
10: filter for preventing Polymer particles (pellets) from scattering and foreign matters from contaminating
11: temperature detection portion (thermometer)
12: bearing on driving side
13: hollow stationary shaft
14: heating medium inlet piping
15: heating medium outlet piping
16: rotating shaft
17: driving motor The rotating shaft 16 is connected to the vessel 1, and rotates the same through the rotation of the driving motor 17. A hollow stationary shaft 13 is installed on the rotating shaft 16. A heating medium is fed to a heating jacket 2 through heating medium inlet piping 14 which is connected to the shaft 13, heats Polymer particles that have been charged in the vessel through a raw material introduction and product discharge port 7, is again passed through the hollow stationary shaft 13, and is discharged through heating medium outlet piping 15.

The rotating shaft 16 and the hollow stationary shaft 13 are sealed in a bearing on driving side 12, and the constitution is such that the heating medium can be fed to the heating jacket 2, while rotating the vessel 1. A suction/exhaust pipe inserted into the vessel (hollow stationary shaft) 8 is installed on the inside of the vessel 1, and on an end of the suction/exhaust pipe 8, there are installed a temperature detection portion and a suction/exhaust port 9 inside the vessel. On an end of the suction/exhaust port inside vessel 9, there is installed a filter 10 for preventing Polymer particles from scattering and being contaminated by foreign matters. The suction/exhaust pipe inserted into the vessel (hollow stationary shaft) 8, which is fixed to the vessel 1, rotates together with vessel 1. A bearing on opposite side of driving 6 is connected to a suction/exhaust pipe (hollow stationary shaft on opposite side of driving) 5, a gas introduction or vacuum arresting valve 4 and an inert gas introduction device and/or vacuum generator 3.

Figure 2:
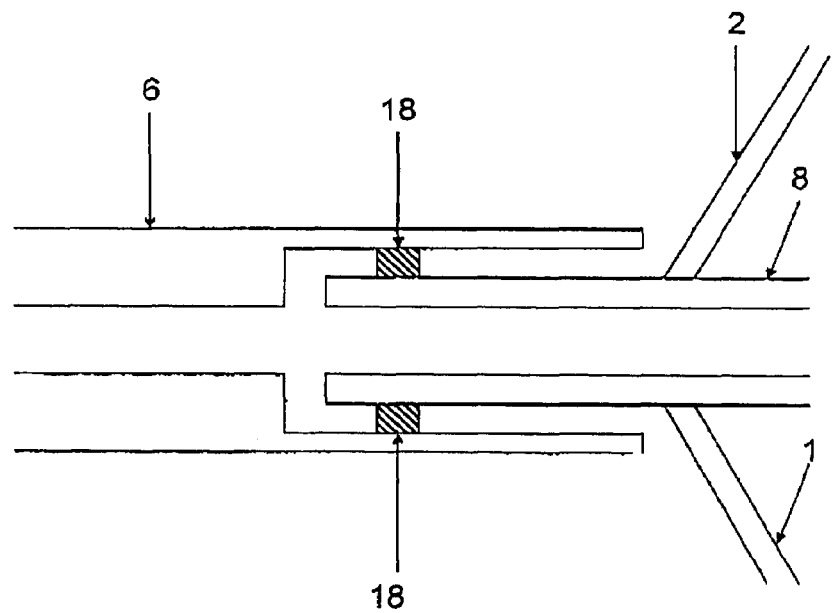
FIG. 2 is a schematic explanatory drawing illustrating an example of structure of bearing (bearing on opposite side of driving) 6 in FIG. 1.

FIG. 2 is a schematic explanatory drawing illustrating an example of structure of bearing (bearing on opposite side of driving) 6.

The symbols in the drawings shall have the following designations.
1: drying and/or solid phase polymerization vessel
2: heating jacket
6: bearing on opposite side of driving
8: suction/exhaust pipe inserted into the vessel (hollow stationary shaft)
18: sealing packing Moisture generated from the heated Polymer particles, moisture attached thereto, and condensation reaction water and low boiling substances accompanying the polycondensation reaction are discharged from the suction/exhaust port inside the vessel 9 through the suction/exhaust pipe inserted into vessel (hollow stationary shaft) 8, the bearing on opposite side of driving 6 and the suction/exhaust pipe (hollow stationary shaft on opposite side of driving) 5. By such constitution, it is enabled to remove the sealing portion from the inside of the vessel, and even if worn sealing material is peeled off the sealing portion, the filter 10 for preventing contamination by foreign matters can prevent the worn sealing material from mixing in the vessel, that is, in the objective product.

The shape of the sealing packing 18 is preferably in the form of ring. The material for the sealing packing 18 needs only to be a substance characterized by excellent heat resistance and low friction coefficient, and nonoccurrence of irreversible change such as decomposition of the components due to friction, deterioration, deformation and the like. Usable examples of the material for the sealing packing include a synthetic resin, carbon material, asbestos (including band-like product in which stainless steel wire is woven), glass yarn, ceramics fiber and a composite material thereof. Of these, a synthetic resin is preferable and fluororesin and its composite material are particularly preferable.

Moreover, there is usable a packing material the surfaces of which are subjected to slidability-imparting treatment. In order to impart slidability to the body of a packing material, there is available an adhesion method using film forming lubricant such as molybdenum disulfide, silicon, fluororesin and graphite.

The vessel inside may include only one suction/exhaust pipe inserted thereinto 9, in which however there is the possibility of difficulty in suction/exhaust resulting in decrease in productivity, since in the case of only one suction/exhaust pipe, it is always immersed in the inside of the Polymer particles depending upon the filling amount of pellet due to the constitution of rotating together with the vessel 1. Accordingly, The suction/exhaust pipes 9 are installed on the suction/exhaust pipe inserted into the vessel (hollow stationary shaft) 8 preferably in a plurality of numbers and at an equal angle, particularly preferably in 3 to 6 numbers. Further by installing the temperature detection portion 11 on an end of the suction/exhaust pipe inserted into the vessel (hollow stationary shaft) 8, and installing the suction/exhaust port inside the vessel 9 in a plurality of numbers on the periphery thereof, the particles on the periphery of the thermometer are agitated with the suction/exhaust port, thereby enabling to enhance the accuracy of temperature detection.

Since the constitution is such that the temperature detection portion 11 rotates together with the vessel 1, the temperature in the vessel 1 is measured preferably by a method comprising detecting wireless communication signals that are emitted from the temperature detection portion 11. The communication signals, which are not limited to specific system provide that each of them is a wireless system, can be selected for use from ultrasonic wave, electromagnetic wave, visible light and the like.

The batchwise heating apparatus according to the present invention is favorably properly usable for drying or solid phase polymerization of polyamide. The polyamide in the present invention is exemplified by the polyamide which is obtained, for instance, by polycondensation of a diamine and a dicarboxylic acid, ring-opening polymerization of lactam and polycondensation of an aminocarboxylic acid.

Specific examples of the diamine include tetramethylenediamine; pentamethylenediamine; hexamethylenediamine; heptamethylenediamine; octamethylenediamine; nonamethylenediamine; orthophenylenediamine; metaphenylenediamine; paraphenylenediamine; orthoxylylenediamine; metaxylylenediamine; paraxylylenediamine; 1,2,-bisaminomethylcyclohexane; 1,3,-bisaminomethylcyclohexane; and 1,4,-bisaminomethylcyclohexane.

Specific examples of the dicarboxylic acid include succinic acid; glutaric acid; adipic acid; suberic acid; sebacic acid; dodecanedioic acid; isophthalic acid; terephthalic acid; phthalic acid; and 2,6-naphthalenedicarboxylic acid.

Specific examples of the lactam include caprolactam; valerolactam; laurolactam; and undecalactam. Specific examples of the aminocarboxylic acid include 1,1-aminoundecanoic acid; and 1,2-aminoundecanoic acid.

EXAMPLE

In the following, the present invention will be described with reference to the working examples. The following methods were used for measurements for the sake of evaluation in the present invention.

[1] Moisture Content (% by Weight)

Moisture content in 2 g of pellets was determined under vaporization conditions at the melting point and for 30 minutes by the use of a Karl Fischer titration moisture meter (manufactured by Mitsbishi Chemical Industries Co., Ltd. under the trade name "CA-06") and a water vaporizer (manufactured by the same under the trade name "VA-06").

[2] Relative Viscosity

One gram of pellets were accurately weighed, dissolved in 100 milliliter (mL) of 96% sulfuric acid at 20 to 30° C. under stirring. After complete dissolution, 5 mL of the resultant solution was promptly taken in a Canon Fenske viscometer, allowed to stand in a thermostat at 25±0.03° C. for 10 minutes and thereafter subjected to measurement of falling time (t), while falling time ($t_0$) of the 96% sulfuric acid itself was measured in the same manner. The relative viscosity was determined from the following formula (A).

$$\text{Relative viscosity} = t/t_0 \quad (A)$$

[3] Crystallinity

By the use of a DSC (manufactured by Shimadzu Science Co., Ltd. under the trade name "DSC-60"), DSC (differential scanning calorimetry) was carried out in a stream of nitrogen at a temperature raising rate of 10 minutes. The crystallinity was determined on the basis of the heat of crystal fusion from exothermic peak assigned to crystallizaion peak and from endothermic peak assigned to fusion in the course of measurement.

The following Polymer particles were used.

(1) Nylon MXD6 Pellets polyamide pellets which were synthesized by liquid phase polymerization from metaxylylenediamine and adipic acid, and which had crystallinity of 5%, moisture content of 0.30% and relative viscosity of 2.09.

(2) Nylon 1,3-BAC6 pellets polyamide pellets which were synthesized by liquid phase polymerization from 1,3,-bisaminomethylcyclohexane and adipic acid, and which had crystallinity of 5%, moisture content of 0.35% and relative viscosity of 2.10.

Example 1

Nylon MXD6 pellets were placed in a batchwise drying apparatus equipped with three suction/exhaust ports inside the vessel, a thermometer, an electromagnetic communication signal system and a sealing packing 18 made of a fluororesin composite, the atmosphere in the apparatus was replaced with nitrogen, and the temperature in the apparatus was raised from room temperature to start drying. At the point of time when the pellet temperature reached 135° C., pressure reducing operation was started to reduce the pressure to 1.33 kPa. Temperature raising of the apparatus was further continued until it reached 140° C., where it was discontinued. At the point of time of 5 hours passage, the apparatus inside was returned to atmospheric pressure, and cooling was started. After the pellet temperature was lowered to 80° C., the pellets were taken out from the apparatus. The physical properties of the objective pellets (dried product) are given in Table 1. Then batchwise drying was repeated 60 times, with a result that contamination by foreign matters originating from sealing packing was not recognized.

Example 2

Nylon MXD6 pellets were placed in a batchwise solid phase polymerization apparatus equipped with three suction/exhaust ports inside vessel, a thermometer, an electromagnetic communication signal system and a sealing packing 18 made of a fluororesin composite, the atmosphere in the apparatus was replaced with nitrogen, and the temperature in the apparatus was raised from room temperature to start drying. At the point of time when the pellet temperature reached 135° C., pressure reducing operation was started to reduce the pressure to 1.33 kPa. Temperature raising of the apparatus was further continued until it reached 200° C., where it was discontinued. The apparatus inside was returned to atmospheric pressure, and cooling was started. After the pellet temperature was lowered to 80° C., the pellets were taken out from the apparatus. The physical properties of the objective pellets (solid phase polymerization product) are given in Table 1. Then batchwise solid phase polymerization was repeated 60 times, with a result that contamination by foreign matters originating from sealing packing was not recognized.

Comparative Example 1

The procedure in Example 1 was repeated to carry out drying of the Nylon MXD6 pellets except that use was made of a conventional drying apparatus in which only the vessel rotates and in which only one suction/exhaust ports inside vessel was installed. The physical properties of the objective pellets (dried product) are given in Table 1. At the point of time when batchwise drying was repeated 22 times, contamination by foreign matters originating from sealing packing was recognized.

Comparative Example 2

The procedure in Example 1 was repeated to carry out solid phase polymerization of the Nylon MXD6 pellets except that use was made of a conventional drying apparatus in which only the vessel rotates and in which only one suction/exhaust ports inside vessel was installed. The physical properties of the objective pellets (solid phase polymerization product) are given in Table 1. At the point of time when batchwise solid phase polymerization was repeated 14 times, contamination by foreign matters originating from sealing packing was recognized.

TABLE 1

| | (Comparative) Example Number | | | |
|---|---|---|---|---|
| | Example 1 | Example 2 | Comp. Example 1 | Comp. Example 2 |
| Polymer particles properties of product | Nylon MXD6 pellets | | | |
| moisture content (%) | 0.05 | 0.03 | 0.05 | 0.03 |
| relative viscosity | 2.10 | 2.65 | 2.10 | 2.66 |
| Number of batches until foreign matter generation | >60 | >60 | 22 | 14 |

Example 3

The procedure in Example 1 was repeated to carry out drying of nylon pellets except that use was made of nylon 1,3-BAC6 pellets in place of nylon MXD6 pellets. The physical properties of the objective pellets (dried product) are given in Table 2. Then batchwise drying was repeated 60 times, with a result that contamination by foreign matters originating from sealing packing was not recognized.

Example 4

The procedure in Example 1 was repeated to carry out solid phase polymerization of nylon pellets except that use was made of nylon 1,3-BAC6 pellets in place of nylon MXD6 pellets. The physical properties of the objective pellets (solid phase polymerization product) are given in Table 2. Then batchwise solid phase polymerization was repeated 60 times, with a result that foreign matter mixing in originating from sealing packing was not recognized.

Comparative Example 3

The procedure in Comparative Example 1 was repeated to carry out drying of nylon pellets except that use was made of nylon 1,3-BAC6 pellets in place of nylon MXD6 pellets. The physical properties of the objective pellets (dried product) are given in Table 2. At the point of time when batchwise drying was repeated 30 times, contamination by foreign matters originating from sealing packing was recognized.

Comparative Example 4

The procedure in Comparative Example 2 was repeated to carry out solid phase polymerization of nylon pellets except that use was made of nylon 1,3-BAC6 pellets in place of nylon MXD6 pellets. The physical properties of the objective pellets (solid phase polymerization product) are given in Table 2. At the point of time when batchwise drying was repeated 22 times, contamination by foreign matters originating from sealing packing was recognized.

TABLE 2

| | (Comparative) Example Number | | | |
|---|---|---|---|---|
| | Example 3 | Example 4 | Comp. Example 3 | Comp. Example 4 |
| Polymer particles properties of product | Nylon 1,3-BAC6 pellets | | | |
| moisture content (%) | 0.05 | 0.03 | 0.05 | 0.03 |
| relative viscosity | 2.10 | 2.61 | 2.10 | 2.60 |
| Number of batches until foreign matter generation | >60 | >60 | 30 | 22 |

It is clear from the results in Tables 1 & 2 that in the case of the batchwise heating apparatus which was used in Examples 1 to 4, contamination by foreign matters originating from sealing packing is not recognized even if drying and solid phase polymerization are repeated, whereas in the case of the batchwise heating apparatus which was used in Comparative Examples 1 to 4, contamination by foreign matters originating from sealing packing is recognized by repeating drying or solid phase polymerization definite times, whereby normal product is not obtained.

INDUSTRIAL APPLICABILITY

The use of the batchwise heating apparatus according to the present invention enables to prevent the product from being contaminated by foreign matters accompanying wear of a sealing packing, and thereby enables efficient production.

The invention claimed is:

1. A batchwise heating apparatus which heats Polymer particles in a rotating hermetically sealed vessel in an atmosphere of inert gas or under reduced pressure, and which comprises a vessel fixed to a temperature detection portion capable of measuring temperature in the vessel during rotating and a suction/exhaust port inside the vessel capable of reducing pressure and/or replacing with inert gas even during rotating, by a suction/exhaust pipe that is inserted into the vessel so as to communicate with said suction/exhaust port, wherein the vessel is supported with a bearing on a driving side thereof and a bearing on the opposite side thereof to the driving side, said opposite side including another suction/exhaust pipe that is connected with an inert gas introduction device and/or vacuum generator, and with said suction/exhaust pipe inserted into the bearing on the opposite side of the driving side, and wherein a rotational sealing portion of said suction/exhaust pipe is installed on the outside of said vessel.

2. The batchwise heating apparatus according to claim 1 wherein the suction/exhaust port inside the vessel comprises a filter.

3. The batchwise heating apparatus according to claim 2 wherein a ring packing is allowed to intervene between a bearing and the suction/exhaust pipe that is inserted into the vessel.

4. The batchwise heating apparatus according to claim 1 wherein a ring packing is allowed to intervene between a bearing and the suction/exhaust pipe that is inserted into vessel.

5. The batchwise heating apparatus according to claim 1 wherein the material of the ring packing is fluororesin or a composite thereof.

6. The batchwise heating apparatus according to claim 1 wherein the vessel comprises a plurality of the suction/exhaust ports inside the vessel.

7. The batchwise heating apparatus according to claim 1 which further comprises a temperature measuring system wherein a temperature is detected by using wireless communication signals that are emitted from a temperature detection portion.

8. The batchwise heating apparatus according to claim 7 wherein the wireless communication signals from the temperature detection portion are ultrasonic waves, electromagnetic waves or visible light.

9. The batchwise heating apparatus according to claim 1 which further comprises a jacket for heating the apparatus with a heating medium or steam.

10. The batchwise heating apparatus according to claim 1 wherein said Polymer particles are polyamide particles.

11. The batchwise heating apparatus according to claim 1 wherein the suction/exhaust port rotates with said vessel.

12. The batchwise heating apparatus according to claim 1 wherein said suction/exhaust pipe rotates together with said vessel.

13. The batchwise heating apparatus according to claim 1 wherein the temperature detection portion rotates with said vessel.

14. A process for drying polyamide which comprises drying polyamide in a batchwise heating apparatus which heats Polymer particles in a rotating hermetically sealed vessel in an atmosphere of inert gas or under reduced pressure, wherein said batchwise heating apparatus comprises:

a vessel fixed to a temperature detection portion capable of measuring temperature in the vessel during rotating, and a suction/exhaust port inside the vessel capable of reducing pressure and/or replacing with inert gas even during rotating, by a suction/exhaust pipe that is inserted into the vessel so as to communicate with said suction/exhaust port, wherein the vessel is supported with a bearing on a driving side thereof and a bearing on the opposite side thereof to the driving side, said opposite side including another suction/exhaust pipe that is connected with an inert gas introduction device and/or vacuum generator, and with said suction/exhaust pipe inserted into the bearing on the opposite side of the driving side, and wherein a rotational sealing portion of said suction/exhaust pipe is installed on the outside of said vessel.

15. A process for solid phase polymerization of polyamide which comprises solid phase polymerizing polyamide in a batchwise heating apparatus which heats Polymer particles in a rotating hermetically sealed vessel in an atmosphere of inert gas or under reduced pressure, wherein said batchwise heating apparatus comprises:

a vessel fixed to a temperature detection portion capable of measuring temperature in the vessel during rotating, and a suction/exhaust port inside the vessel capable of reducing pressure and/or replacing with inert gas even during rotating, by a suction/exhaust pipe that is inserted into the vessel so as to communicate with said suction/exhaust port, wherein the vessel is supported with a bearing on a driving side thereof and a bearing on the opposite side thereof to the driving side, said opposite side including another suction/exhaust pipe that is connected with an inert gas introduction device and/or vacuum generator, and with said suction/exhaust pipe inserted into the bearing on the opposite side of the driving side, and wherein a rotational sealing portion of said suction/exhaust pipe is installed on the outside of said vessel.

16. A process for heating a batchwise heating apparatus which comprises heating Polymer particles in an apparatus comprising a rotating hermetically sealed vessel in an atmosphere of inert gas or under reduced pressure, wherein said apparatus comprises:

a vessel fixed to a temperature detection portion capable of measuring temperature in the vessel during rotating, and a suction/exhaust port inside the vessel capable of reducing pressure and/or replacing with inert gas even during rotating, by a suction/exhaust pipe that is inserted into the vessel so as to communicate with said suction/exhaust port, wherein the vessel is supported with a bearing on a driving side thereof and a bearing on the opposite side thereof to the driving side, said opposite side including another suction/exhaust pipe that is connected with an inert gas introduction device and/or vacuum generator, and with said suction/exhaust pipe inserted into the bearing on the opposite side of the driving side, and wherein a rotational sealing portion of said suction/exhaust pipe is installed on the outside of said vessel.

17. The process according to claim 16, wherein the apparatus further comprises a jacket for heating the apparatus with a heating medium, and wherein the process further comprises passing said heating medium through the jacket so as to heat the apparatus.

18. The process according to claim 16 wherein the suction/exhaust port rotates with said vessel.

19. The process according to claim 16 wherein the suction/exhaust pipe rotates together with said vessel.

20. The process according to claim 16 wherein the temperature detection portion rotates with said vessel.

* * * * *